(No Model.)

H. v. PÜCKLER.
INSECT TRAP.

No. 473,778. Patented Apr. 26, 1892.

Witnesses:
E. B. Bolton
H. Kusterer

Inventor:
Heinrich v. Puckler

By
his Attorneys.

UNITED STATES PATENT OFFICE.

HEINRICH GRAF V. PÜCKLER, OF OBERWEISTRITZ, GERMANY.

INSECT-TRAP.

SPECIFICATION forming part of Letters Patent No. 473,778, dated April 26, 1892.

Application filed October 8, 1891. Serial No. 408,122. (No model.)

*To all whom it may concern:*

Be it known that I, HEINRICH GRAF V. PÜCKLER, a subject of the King of Prussia, residing at Oberweistritz, in Silesia, German Empire, have invented certain new and useful Improvements in Insect-Traps, of which the following is a specification.

The object of my invention is a device for destroying in large masses insects that are harmful to vegetation; and it consists, preferably, of a net made of platinum wire, which is put into the current of a battery whose current is powerful enough to bring the wires of the net to a glow and to keep them so. This net is set up isolated after sundown or before sunrise on the endangered ground, and the wires are brought to glow by the electric current. The light from this net attracts the insects, which fly against the net, burn their wings, and are thus rendered harmless.

In order to make my invention more clearly understood, I have shown in the accompanying drawings means for carrying the same into effect.

Figure 1:
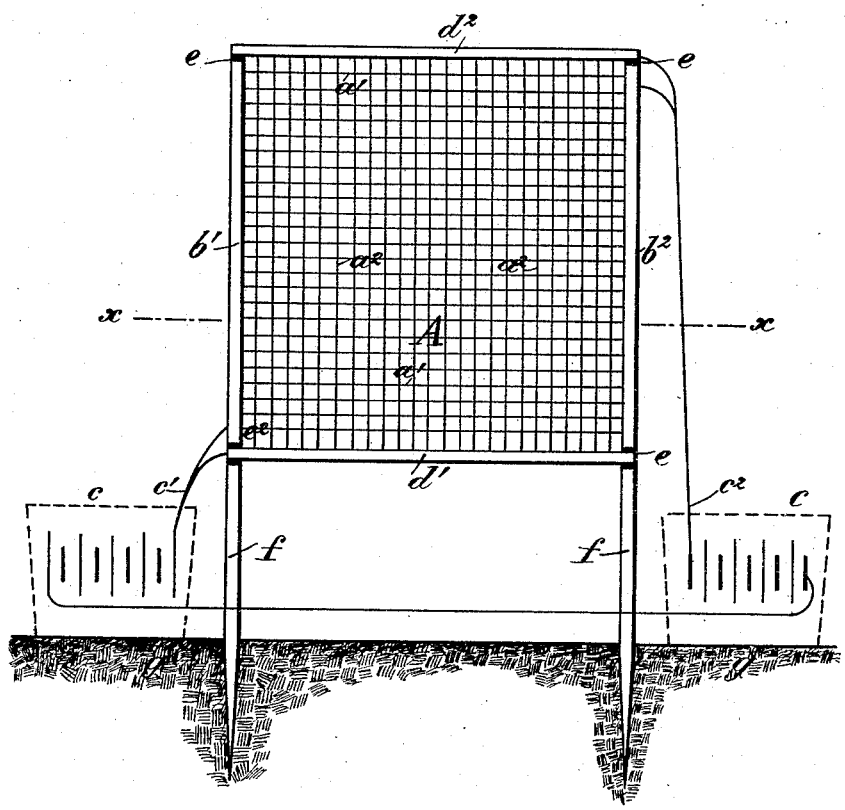
Figure 2:
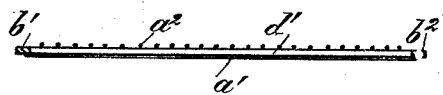
Figure 2:
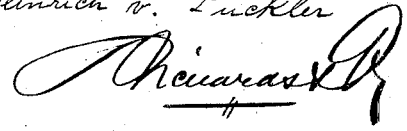

Referring to said drawings, Figure 1 is a front view of a device embodying my improvement. Fig. 2 is a section of the same, taken on line $x\ x$, Fig. 1.

In said drawings, A, Fig. 1, is the net made of platinum wire. It consists of two systems of threads $a'$ and $a^2$, crossing one another at right angles and isolated one from another. The horizontal wires $a'$ are connected electrically at both sides with perpendicular rods $b'\ b^2$, of which the one $b'$ is in connection with the positive pole $c'$ and the other $b^2$ with the negative pole $c^2$ of a battery $c$, set up on the ground. The perpendicular wires $a^2$ are connected in the same manner at the sides with horizontal rods $d'\ d^2$, which rods are also in connection with the poles of battery $c$. The rods $d'\ d^2$ are isolated from the rods $b'\ b^2$ at $e$, and the frame $b'\ b^2\ d'\ d^2$, bearing the net A, is attached by means of the rod $d'$ to the upper part of two wooden posts $f\ f'$, which are driven into the ground $g$. The current emanating from the positive pole $c'$ divides into two parts, of which one goes through the rod $b'$, the wires $a'$, and the second rod $b^2$, while the other goes through the rod $d'$, the wires $a^2$, and the second rod $d^2$. From the rods $b^2$ and $d^2$, which are in connection by wire with the pole $c^2$ of the battery, the current returns to the battery. The net formed by the wires $a'$ and $a^2$ must have such fine meshes that the insects cannot fly through it. It is advantageous to arrange the wires $a'$ and $a^2$ so that they will not come in contact at any point. The two wires $a'$ and $a^2$ can also cross one another obliquely or be set in any desired manner. Further, the net might consist of one wire system only. Instead of the battery, a dynamo-machine may be used, and in both cases the net may be so switched into the current that only one undivided current traverses the net. One or several lamps (arc or incandescent) may be placed in the middle of the net before or behind the same, to better attract the insects should the net alone not be sufficiently luminous. It will be noticed from this arrangement that the cross-wires $a'\ a^2$ are arranged in multiple arc between the conducting-rods $b'\ b^2$ and $d'\ d^2$, respectively, and the lure is produced by the light from the wires of the net itself, each wire being in a closed circuit.

What I claim is—

1. An insect-trap consisting of a net formed of conducting-wire, the electric generator, and electrical connections therefrom to the net, the wire of said net forming parts of a closed circuit and adapted to be heated to a glow to form the lure, substantially as described.

2. In combination, the frame consisting of the side rods $b'\ b^2$ and the horizontal rods $d'\ d^2$, insulated therefrom, the electrical connections to the said rods $b'\ b^2$ and $d'\ d^2$, respectively, the horizontal cross-wires $a'$ between the side rods, and the wires $a^2$ between the rods $d'\ d^2$, each of said series of wires forming parts of the circuit between their respective rods, substantially as described.

In testimony whereof I have signed my name to this specification in the presence of two subscribing witnesses.

HEINRICH GRAF V. PÜCKLER.

Witnesses:
 REINHOLD KLINKERT,
 SELMA BAUMGART.